(12) United States Patent
Luo et al.

(10) Patent No.: US 9,426,074 B2
(45) Date of Patent: *Aug. 23, 2016

(54) SYSTEM DETECTION METHOD AND APPARATUS AND FLOW CONTROL METHOD AND DEVICE

(71) Applicant: International Business Machines Corporation, Armonk, NY (US)

(72) Inventors: Ren Shi Luo, Beijing (CN); Asser N. Tantawi, Somers, NY (US); Hai Shan Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,577

(22) Filed: Jul. 27, 2015

(65) Prior Publication Data

US 2015/0334023 A1    Nov. 19, 2015

Related U.S. Application Data

(63) Continuation of application No. 13/870,014, filed on Apr. 25, 2013, now Pat. No. 9,124,505.

(30) Foreign Application Priority Data

Apr. 28, 2012    (CN) .......................... 2012 1 0132477

(51) Int. Cl.
| | |
|---|---|
| *H04L 12/801* | (2013.01) |
| *H04L 12/26* | (2006.01) |
| *G06F 11/30* | (2006.01) |
| *G06F 9/50* | (2006.01) |
| *G06F 11/34* | (2006.01) |

(52) U.S. Cl.
CPC ................ *H04L 47/12* (2013.01); *G06F 9/505* (2013.01); *G06F 11/30* (2013.01); *G06F 11/3433* (2013.01); *H04L 43/0817* (2013.01); *H04L 43/0888* (2013.01); *G06F 11/3419* (2013.01); *G06F 11/3466* (2013.01); *G06F 2201/88* (2013.01); *G06F 2209/501* (2013.01)

(58) Field of Classification Search
CPC . H04L 43/0817; H04L 47/12; H04L 67/1012; H04L 12/5695; G06F 9/5038; G06F 8/60; G06F 11/30
See application file for complete search history.

(56) References Cited

U.S. PATENT DOCUMENTS

| | | | | |
|---|---|---|---|---|
| 7,539,608 | B1 | 5/2009 | Dageville et al. | 703/21 |
| 7,937,470 | B2 | 5/2011 | Curley et al. | 709/226 |

(Continued)

*Primary Examiner* — Chi H Pham
*Assistant Examiner* — Shailendra Kumar
(74) *Attorney, Agent, or Firm* — Fleit Gibbons Gutman Bongini Bianco PL; Jeffrey N. Giunta

(57) ABSTRACT

A system detection method and apparatus. The throughput and response time of the system are acquired, where the throughput reflects the number of requests from outside the system that has been processed by the system. The response time reflects time required by the system to process requests from outside the system. The system performance characteristic parameter based on the throughput and response time is obtained and is used to describe congestion condition of the system to determine whether there is a bottleneck in the system. Also provided are a method and device for flow control. The system detection method and apparatus allow detecting a bottleneck and flow control in a simple and effective way to ensure that requests are processed in time.

18 Claims, 5 Drawing Sheets

(56) References Cited

U.S. PATENT DOCUMENTS

| | | | |
|---|---|---|---|
| 8,606,905 B1* | 12/2013 | Martin | G06F 8/60 709/224 |
| 2006/0074970 A1* | 4/2006 | Narayanan | G06F 11/3419 |
| 2006/0106926 A1 | 5/2006 | Kato et al. | 709/223 |
| 2008/0301696 A1 | 12/2008 | Tantawi et al. | 718/105 |
| 2009/0150536 A1 | 6/2009 | Wolman et al. | 709/224 |
| 2009/0178047 A1* | 7/2009 | Astley | G06F 9/5038 718/104 |
| 2010/0005468 A1 | 1/2010 | Chang et al. | 718/102 |
| 2012/0008501 A1 | 1/2012 | Lundh et al. | 370/235 |

* cited by examiner

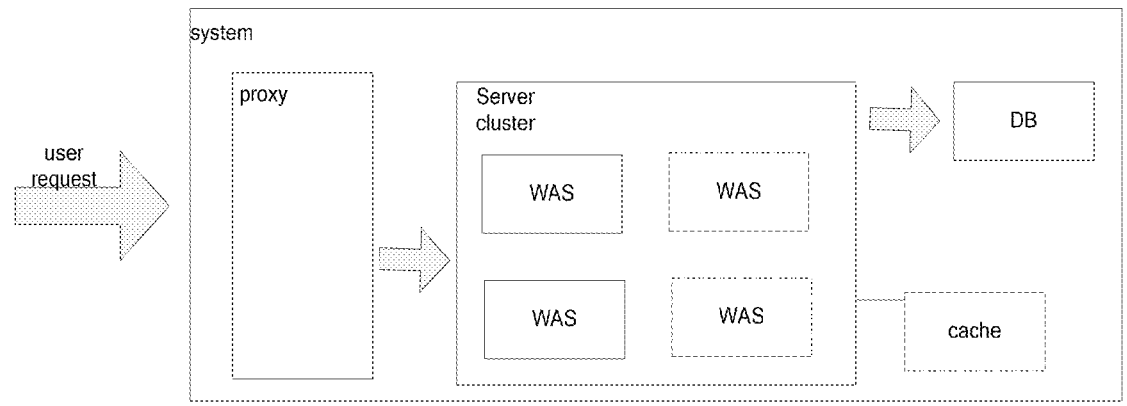
Fig. 3
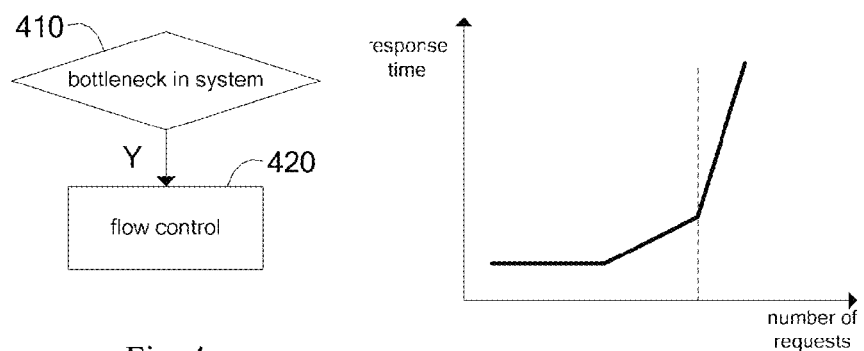
Fig. 4
Fig. 5

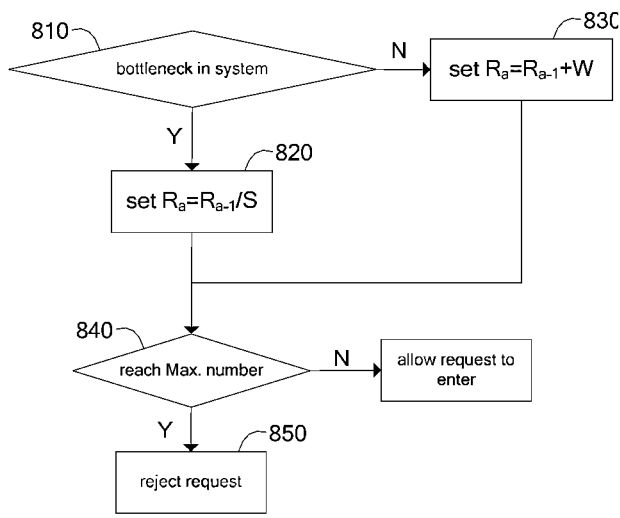
Fig. 8
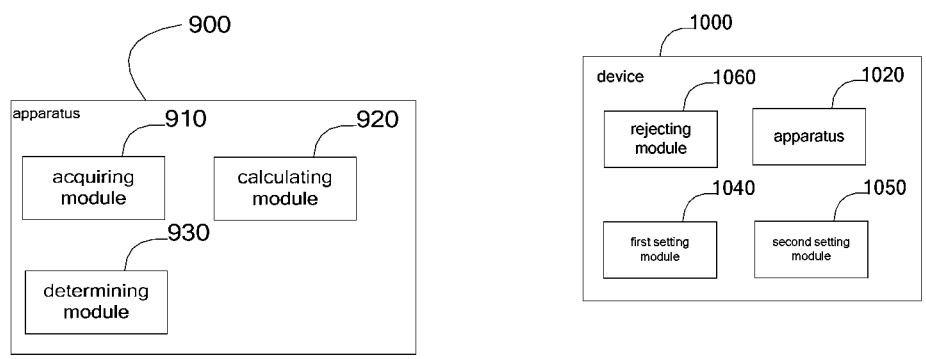
Fig. 9
Fig. 10

SYSTEM DETECTION METHOD AND APPARATUS AND FLOW CONTROL METHOD AND DEVICE

BACKGROUND OF THE INVENTION

1. Field of the Invention

The present invention relates to a detection field, and more specifically, to a system detection method and an apparatus for system detection, and a flow control method and a device for flow control.

2. Description of Related Art

With the development of technology, systems composed of devices that process user requests on the server side become more complex and larger. As the number of user requests processed by the system increases, when there is a bottleneck in some resources of the system, response time to request related to these resources will become very large, so a user has to wait for a very long time to get the response and user experience is very poor. Many resources in the system will bottleneck, such as, CPU, storage, input/output etc. all of which can bottleneck, resulting in a sharp decline of system performance.

Thus, as for how to detect system bottleneck and optimize the system, a white box test scheme has been proposed in prior art. This scheme will determine in advance one or more resources that can cause bottlenecks in the system and employ an optimization method for this resource bottleneck, or, this scheme needs to set a monitor for each type of resources in the system and enforces corresponding optimization scheme based on monitor's feedback of whether there is a bottleneck in that resource. Such a scheme has certain problems, for example, as to the one or more predetermined resources that can cause a bottleneck in the system, since there can be one or more resources causing a bottleneck in the system and the number can change dynamically. This predetermined optimization scheme functions only when resources causing a bottleneck in the system are just the predetermined ones and can not function in other cases. If a scheme of setting a monitor for each resource is employed, there can be a problem that the number of required monitors is too many and the optimization scheme is too complex to be actually implemented. Thus, in practice, using white box technology is difficult to achieve effective detection on system bottleneck.

As for TCP, there is a black box detection technology in prior art, which judges whether there is any band width bottleneck through parameters such as packet loss rate and packet disordering, however, this technology is primarily intended for transport layer and is difficult to be applied in a system handling request of user devices. Further, there is no such parameter as packet loss rate in the system, and such black box detection cannot be performed.

SUMMARY OF THE INVENTION

In order to be capable of conducting simple and effective detection on a system, the present invention provides a system detection method and an apparatus for system detection, and a flow control method and a device for flow control.

Accordingly, one aspect of the invention provides a system detection method which includes acquiring throughput and response time of the system, where the throughput reflects the number of requests from outside of the system that have been processed by the system, and the response time reflects time required by the system to process requests from outside of the system; obtaining system performance characteristic parameter based on the throughput and the response time, the system performance characteristic parameter being used to describe congestion condition of the system; and determining whether there is bottleneck in the system based on the system performance characteristic parameter.

Accordingly, another aspect of the invention provides a flow control method that includes: determining whether there is bottleneck in a system in accordance with the system detection method; and initiating flow control on the system if there is bottleneck in the system.

Accordingly, another aspect of the invention provides an apparatus for system detection where the apparatus includes: an acquiring module configured to acquire throughput and response time of the system, where the throughput reflects the number of requests from outside of the system that have been processed by the system, and the response time reflects time required by the system to process requests from outside of the system; a calculating module configured to obtain system performance characteristic parameter based on the throughput and the response time, the system performance characteristic parameter being used to describe congestion condition of the system; and a determining module configured to determine whether there is a bottleneck in the system based on the system performance characteristic parameter.

Accordingly, another aspect of the invention provides a device for flow control where the device includes: the apparatus mentioned above; and a controlling module configured to initiate flow control on the system if it is judged by the apparatus that there is a bottleneck in the system.

The technical solution provided by the present invention can detect deterioration in system performance in a simple and effective way.

BRIEF DESCRIPTION OF THE DRAWINGS

Through the more detailed description of some embodiments of the present disclosure in the accompanying drawings, the above and other objects, features and advantages of the present disclosure will become more apparent, where the same reference generally refers to the same components in the embodiments of the present disclosure.

FIG. 3 shows a structural diagram of a system according to an embodiment of the present invention;

FIG. 4 shows a flow diagram of a flow control method according to an embodiment of the present invention.

FIG. 5 shows a diagram of system congestion condition in the embodiments of the present invention.

FIG. 8 shows a flow diagram of still another flow control method according to an embodiment of the present invention;

FIG. 9 shows a structural diagram of an apparatus for system detection according to an embodiment of the present invention.

FIG. 10 shows a structural diagram of another device for flow control according to an embodiment of the present invention.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
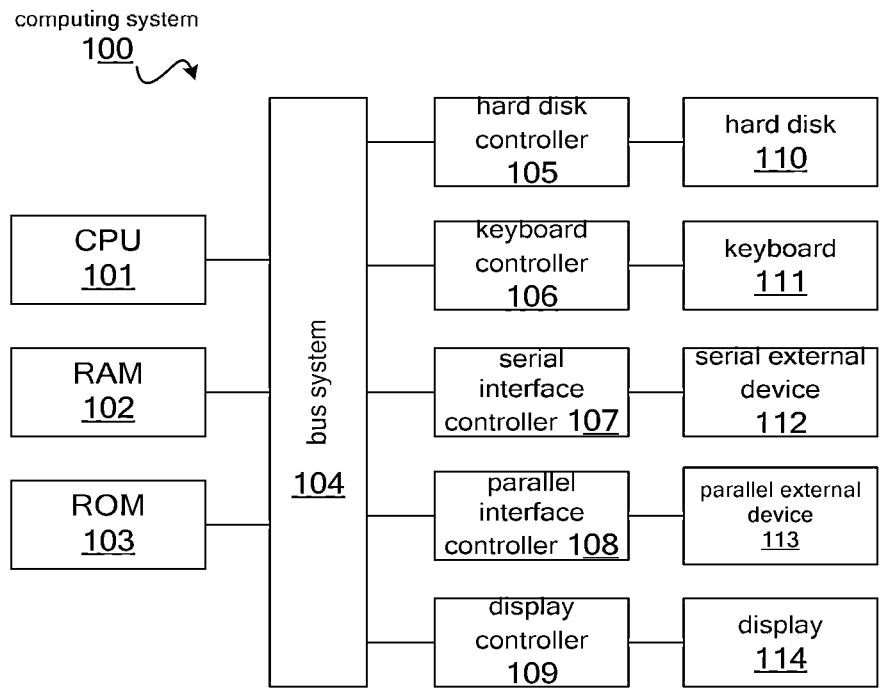
FIG. 1 shows an exemplary computer system that can implement each embodiment of the present invention.

FIG. 1 shows an exemplary computing system 100 which is applicable to implement the embodiments of the present invention. As shown in FIG. 1, the computing system 100 can include: CPU (Central Process Unit) 101, RAM (Random Access Memory) 102, ROM (Read Only Memory) 103, Bus System 104, Hard Disk Controller 105, Keyboard Controller 106, Serial Interface Controller 107, Parallel Interface Controller 108, Display Controller 109, Hard Disk 110, Keyboard 111, Serial External Device 112, Parallel External Device 113 and Display 114. Among above devices, CPU 101, RAM 102, ROM 103, Hard Disk Controller 105, Keyboard Controller 106, Serial Interface Controller 107, Parallel Interface Controller 108 and Display Controller 109 are coupled to the Bus System 104. Hard Disk 110 is coupled to Hard Disk Controller 105. Keyboard 111 is coupled to Keyboard Controller 106. Serial External Device 112 is coupled to Serial Interface Controller 107. Parallel External Device 113 is coupled to Parallel Interface Controller 108. Display 114 is coupled to Display Controller 109. It should be understood that the structure as shown in FIG. 1 is only for the exemplary purpose rather than any limitation to the present invention. In some cases, some devices can be added to or removed from the computing system 100 based on specific situations.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
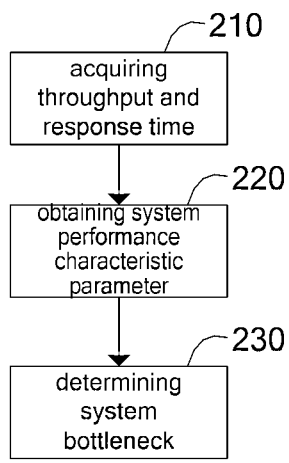
FIG. 2 shows a flow diagram of a system detection method according to an embodiment of the present invention.

FIG. 2 shows a system detection method according to an embodiment of the invention. In the embodiment and each embodiment below, the referred system can include one or more devices involved in processing requests from outside of the system, for example. A typical system can include proxy, server, cache and database where the server can be a plurality of server clusters, for example, and each server cluster can include a plurality of WAS (Web Application Server). FIG. 3 shows an example of a system according to an embodiment of the invention. As for the system shown in FIG. 3, a request made from outside of the system is a user request; that is, a request sent from client.

The system detection method according to the embodiment shown in FIG. 2 includes the following steps:

step 210, acquiring throughput and response time of the system;

step 220, obtaining system performance characteristic parameter based on the throughput and the response time;

step 230, determining whether there is a bottleneck in the system based on the system performance characteristic parameter.

In this embodiment, the throughput reflects the number of requests from outside of the system that have been processed by the system, the response time reflects time required by the system to process requests from outside of the system. The throughput can be all responses to requests from outside of the system that are issued from the system within a unit of time, and they include responses about successful requests, as well as responses about requests rejected by system or responses containing exceptions or errors. Those skilled in the art can appreciate that the throughput can be represented by other practical measurements. For example, the throughput can be a response about successful requests from outside of the system that are issued from the system within a unit of time. In this case, it does not contain rejection response issued from the system and other response containing exception or error. In this embodiment, the response time can be, for example, time lapsed from the time at which a request is received by the system to the time at which response to that request is issued.

Since both throughput and response time of a system can be easily acquired outside of the system, embodiments of the invention need not know internal structure of the system or exactly which resource has resulted in system bottleneck, as a black box test can be performed on the system. This test is simple and easy to implement, and can reflect system's performance condition in a relatively accurate way.

In this embodiment, the system performance characteristic parameter is used to describe congestion condition of the system, for example. The system performance characteristic parameter can be proportional to the throughput and inversely proportional to the response time. Those skilled in the art can appreciate that the system performance characteristic parameter can be inversely proportional to the throughput and proportional to the response time.

In this embodiment, a ratio of throughput to response time can be used as the system performance characteristic parameter. For example, the system performance characteristic parameter $P=A \times (throughput/response\ time)$, wherein A is a constant. Those skilled in the art can appreciate that other functions can also be used to calculate the system performance characteristic parameter, as long as the obtained value can describe congestion condition of the system. In this embodiment, a ratio of throughput to response time is used to calculate the system performance characteristic parameter, the calculation is simple, thus easier to implement and being more reliable.

As shown in FIG. 5, since there is a bottleneck in resources within the system, system's response time will increase sharply as the number of requests increases. Specifically, referring to the right side of FIG. 5, system congestion is very severe at this point in time, for a user whose request has been accepted by the system, and the system cannot give response within a reasonable time. With the system detection method according to the embodiment of the invention, the system can be prevented from entering into the severe congestion condition shown in FIG. 5 through detection. Moreover, in comparison to white box test, the detection method according to the present embodiment is simple, accurate, effective, lower in cost, and the method provided by the present embodiment can be utilized regardless of how large or complex the system is. By simply and effectively detecting system congestion, when there is bottleneck in the system, flow control can be performed on the system. A new request will be rejected so as to ensure that a request entering into the system will be responded within a reasonable time, thereby improving user's experience and ensuring normal operation of the system.

In this embodiment, for example, step 210 can include the following two steps: directly sampling the throughput and the response time of the system; and conducting noise filtering on the sampled throughput and response time. Accordingly, step 220 is embodied as: obtaining system performance characteristic parameter based on the noise filtered throughput and response time.

In this embodiment, there can be many specific implementations for conducting noise filtering. For example, noise filtering can be achieved by simply averaging the acquired throughput and response time over a certain period of time respectively, or, by performing curve fitting on the acquired throughput and response time respectively. Those skilled in the art can appreciate that other approaches can also be used to conduct noise filtering on the acquired data (the description of which will be omitted here for brevity).

For exemplary purposes, the present embodiment will be described in detail by utilizing average values for noise filtering. Step 210 involves acquiring throughput $TR_1$, $TR_2$, $TR_3$ ... $TR_k$ and response time $RT_1$, $RT_2$, $RT_3$ ... $RT_k$ of the system, where 5 seconds are taken as a unit of sampling time. Step 210 involves calculating moving average of throughput in 300 seconds, i.e., $avgTR_1$, $avgTR_2$, $avgTR_3$ ... $avgTR_m$, and moving average of response time in 300 seconds, i.e., $avgRT_1$, $avgRT_2$, $avgRT_3$ ... $avgRT_m$. In step 220, obtaining through calculation system performance characteristic parameters $P_1$, $P_2$, $P_3$ ... $P_m$ based on system performance characteristic parameter calculation method $P_n=avgTR_n/avgRT_n$, wherein, n=1 ... m. Step 230 involves determining whether there is a bottleneck in the system based on the system performance characteristic parameter.

In this embodiment, by conducting noise filtering on the acquired throughput and response time and using noise filtered data to calculate system performance characteristic parameter, influence due to sampling noise points can be avoided, and detection result can be more accurate.

In this embodiment, step 220 can include, for example: obtaining system performance characteristic parameter based on the throughput and the response time; and conducting noise filtering on the system performance characteristic parameter. Accordingly, step 230 involves determining whether there is a bottleneck in the system based on the noise filtered system performance characteristic parameter. For on noise filtering, reference can be made to the previous method, the description of which will be omitted for brevity. Determining system bottleneck by using the noise filtered system performance characteristic parameter will be more accurate, and can avoid influence of noise points.

In this embodiment, the above description can be combined, that is, not only conduct noise filtering on the acquired throughput and response time, but also conduct noise filtering on the system performance characteristic parameter obtained by calculating the noise filtered throughput and response time, so as to be able to make more accurate judgment. The noise filtering method conducted on throughput and response time can be different from that conducted on system performance characteristic parameter.

In the embodiment shown in FIG. 2, step 230 can be implemented in many ways. For example, in a case where the system performance characteristic parameter is proportional to the throughput and inversely proportional to the response time, step 230 can involve: judging whether current data is in a trend of increasing, where the data is at least one of the throughput and the response time; judging whether current system performance characteristic parameter is in a trend of decreasing; and determining that there is a bottleneck in the system if the current data is in a trend of increasing and the current system performance characteristic parameter is in a trend of decreasing.

In this embodiment, where the system performance characteristic parameter is inversely proportional to the throughput and proportional to the response time, for example, step 230 involves: judging whether current data is in a trend of increasing, the data is at least one of the throughput and the response time; judging whether current system performance characteristic parameter is in a trend of increasing; and determining that there is a bottleneck in the system if the current data is in a trend of increasing and the current system performance characteristic parameter is in a trend of increasing.

Those skilled in the art can appreciate that, when there is other relationship between system performance characteristic parameter and throughput as well as response time, step 230 will change accordingly to judge point of system performance deterioration.

In this embodiment, there are many ways to judge whether current data is in a trend of increasing. For example, judging whether current data is larger than the immediately previous data, or judging whether current data is larger than certain previous data, or judging slope of curve where current data is located, all of which will be omitted here for brevity.

In this embodiment, there are also many ways to judge whether current system performance characteristic parameter is in a trend of decreasing. For example, it can be judged whether the current system performance characteristic parameter meets a specific condition; if yes, then it is considered that the current system performance characteristic parameter is in a trend of decreasing. The specific condition includes one of: being less than a previous system performance characteristic parameter; being the continual $X^{th}$ system performance characteristic parameter meeting $P_m < P_{m-1}$, wherein $P_{m-1}$ is a previous system performance characteristic parameter of $P_m$; a difference of being less than the maximum value of system performance characteristic parameter exceeding a predetermined range; and being the continual $Y^{th}$ system performance characteristic parameter meeting that $P_{max} - P_n$ exceeds a predetermined range, wherein $P_{max}$ is the maximum value of system performance characteristic parameter. Those skilled in the art can appreciate that there are still other ways to judge whether current system performance characteristic parameter is in a trend of decreasing. For example, judging the slope of curve where the current system performance characteristic parameter is located. It is simpler to judge whether the current system performance characteristic parameter is in a trend of decreasing through the above specific conditions, and the specific conditions of setting scope and continual situation therein can avoid misjudgment due to fluctuation in certain extent, such that the judgment is more accurate and reliable.

In this embodiment, there are also many ways to judge whether current system performance characteristic parameter is in a trend of increasing. For example, it can be judged whether the current system performance characteristic parameter meets a specific condition; if yes, then it is considered that the current system performance characteristic parameter is in a trend of increasing. The specific condition includes one of: being larger than a previous system performance characteristic parameter; being the continual $X^{th}$ system performance characteristic parameter meeting $P_m > P_{m-1}$, wherein $P_{m-1}$ is a previous system performance characteristic parameter of $P_m$; a difference of being larger than the minimum value of system performance characteristic parameter exceeding a predetermined range; and being the continual $Y^{th}$ system performance characteristic parameter meeting that $P_n - P_{min}$ exceeds a predetermined range, wherein $P_{min}$ is the minimum value of system performance characteristic parameter. Those skilled in the art can appreciate that there are still other ways to judging whether current system performance characteristic parameter is in a trend of increasing. For example, judging slope of curve where current system performance characteristic parameter is located.

Based on the above description, step 230 can be embodied as: judging whether the $p^{th}$ system performance characteristic parameter is less than the $p-1^{th}$ system performance characteristic parameter and meanwhile judging whether the $p^{th}$ response time is larger than the $p-1^{th}$ response time. If both results are yes, then it is determined that there is a bottleneck in the system.

Step 230 can also involve: judging whether a difference that the $p^{th}$ system performance characteristic parameter is less than the maximum value of system performance characteristic parameter exceeds a predetermined range, and whether the $p^{th}$ throughput is larger than the $p-1^{th}$ throughput. If yes, the determination is made that there is a bottleneck in the system.

In a specific implementation of step 230, the predetermined range can be 20% of the maximal value of system performance characteristic parameter. The maximal value of system performance characteristic parameter being the largest value among previous p−1 system performance characteristic parameters, or being the largest value of previous p−1 system performance characteristic parameters and the $p^{th}$ system performance characteristic parameter. The manner of acquiring system performance characteristic parameter can be based on an existing manner of acquiring the largest value in a sequence, the description of which will be omitted for brevity.

Those skilled in the art can derive other manners of implementing step 230 from the specific implementation of step 230. For example, when a difference that the $p^{th}$ system performance characteristic parameter is less than the maximal value of system performance characteristic parameter exceeds a predetermined range, and the $p^{th}$ response time is larger than the response time corresponding to the maximal value of system performance characteristic parameter, it is judged whether there are q sequential system performance characteristic parameters and response times that meet the above condition. If yes, the determination is made that there is a bottleneck in the system, wherein, q is a predetermined natural number.

In this embodiment, it is desired in the specific implementation of step 230 to find a turning point of system performance characteristic parameter or to find a point capable of indicating system performance deterioration under a trend that response time and/or throughput is increasing.

It can be seen in the specific implementation of the above step 230 that it is relatively simple to directly judge whether system performance characteristic parameter decreases or continually decreases. However, it can be influenced by noise and fluctuation. The solution of judging whether a difference with the maximal value exceeds a predetermined range or lasts for certain number of times while exceeding a predetermined range is more resistant to noise and fluctuation, and system judgment is more stable, thereby avoiding frequently or improperly initiating flow control.

In the specific implementation of the above step 230, for example, it is possible to first judge whether response time or throughput is in a trend of increasing. If it is not in a trend not, further judgment is not performed; if it is in a trend, it proceeds to judgment on system performance characteristic parameter; alternatively, both of them are judged concurrently, or system performance characteristic parameter is first judged, then the trend of response time or throughput is judged.

In this embodiment, in order to make more accurate judgment and reduce interference from noise, for example, a solution of conducting noise filtering on the acquired data first and then calculating system performance characteristic parameter can be employed. Here, the noise filtered response time or throughput can be utilized when performing comparison, so as to be more accurate when judging the trend of response time or throughput.

The methods provided by the above embodiments can be combined with each other to obtain other embodiments.

Figure 6:
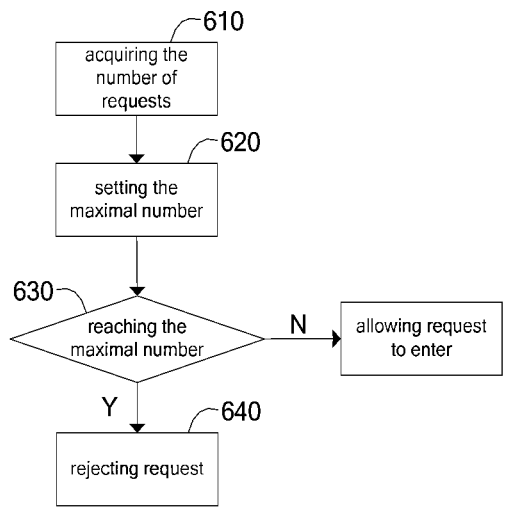
FIG. 6 shows a flow diagram of another flow control method according to an embodiment of the present invention.

The embodiment as shown in FIG. 6 provides a flow control method, which includes the following steps:

step 610: acquiring the number of requests that have currently entered into a system;

step 620: setting the maximal number of requests that are currently allowed to enter into the system;

step 630: judging whether the number of requests that have currently entered into the system reaches the maximal number of requests that are currently allowed to enter into the system; if yes, the flow control method proceeds to step 640; otherwise, the flow control method allows a new request to enter into the system;

step 640: rejecting new request to enter into the system.

In this embodiment, step 620 can be implemented in many ways. The following description takes Additive Increase Multiplicative Decrease (AIMD) algorithm for example to implement step 620. If it is determined that there is a bottleneck in the system, then the maximal number of requests that are currently allowed to enter into the system can be set as $R_a = R_{a-1}/S$. $R_a$ is the maximal number of requests that are currently allowed to enter into the system, $R_{a-1}$ is a previous maximal number of requests that are allowed to enter into the system, S is a constant, generally, S is larger than 1. If there is no bottleneck in the system or bottleneck is eliminated by rejecting request, the maximal number of requests that are currently allowed to enter into the system can be set as $R_a = R_{a-1} + W$. $R_a$ and $R_{a-1}$ are still current and previous maximal number of requests that are allowed to enter into the system, W is a constant, generally, W is a positive integer. Typical, value of W can be set as 3. In judging whether there is a bottleneck in the system, reference can be made to the embodiment shown in FIG. 2.

Those skilled in the art can appreciate that, other algorithms can also be used to implement step 620. For example, it is possible to set the maximal number of requests that are currently allowed to enter into the system as a fixed or variable multiple of the previous maximal number of requests that are allowed to enter into the system before a bottleneck occurs in the system, or as incremental linear increase of the two. If there is a bottleneck in the system, the maximal number of requests that are currently allowed to enter into the system is set as a value whose difference with the previous maximal number of requests that are allowed to enter into the system is fixed, or as a linearly decreased value, etc.

The method according to the embodiment can ensure that a response to request processed by the system is given in a reasonable time by detecting bottleneck in the system and limiting the number of requests entering into the system when system bottleneck is detected, thereby improving user's experience that requests are accepted. Further, this method is simple and easy to implement, and is more accurate.

The embodiment as shown in FIG. 4 provides a flow control method that includes the following steps:

step 410: judging whether there is a bottleneck in a system;

step 420: initiating flow control on the system if there is a bottleneck.

In this embodiment, for the specific implementation of step 410, reference can be made to the embodiment shown in FIG. 2. In this embodiment, an AIMD algorithm can be used to conduct flow control. Referring to the embodiment shown in FIG. 6, other methods can also be used to perform specific flow control. Next, a detailed description is made through a specific implementation of the embodiment shown in FIG. 8.

The flow control method depicted in FIG. 8 includes:

step 810: judging whether there is a bottleneck in a system; if yes, then the method proceeds to step 820; otherwise, to step 830;

step 820: setting the maximal number of requests that are currently allowed to enter into the system as $R_a = R_{a-1}/S$, where the value of S can be and is typically 1.1, then proceeding to step 840;

step 830: setting the maximal number of requests that are currently allowed to enter into the system as $R_a = R_{a-1} + W$, then proceeding to step 840;

step 840: judging whether the number of requests that have currently entered into the system reaches the maximal number of requests that are currently allowed to enter into the system, if the number reaches or exceeds the maximal number, then proceeding to step 850; otherwise, allowing new request to enter into the system;

step 850: rejecting new request to enter into the system.

In this embodiment, in order to rapidly increase the maximal number of requests that are allowed to enter into the system at initial phase during which the number of requests processed by the system is relatively small, the maximal number of requests that are currently allowed to enter into the system can be set as $R_a = BR_{a-1}$ at the initial phase. B is a number larger than 1, typically, the value of B can be 2. When judging whether it is initial phase, for example, the judgment can be made by utilizing the system performance characteristic parameter. If a current system performance characteristic parameter is less than the previous system performance characteristic parameter, then it is considered as initial phase.

In this embodiment, for how to obtain the system performance characteristic parameter and how to judge whether there is bottleneck in the system, reference can be made to the method embodiments described above, the description of which will be omitted here for brevity.

In the flow control method provided in this embodiment, the number of requests entering into the system is allowed to increase rapidly in case that the system is far from the state at which bottleneck occurs. The number of requests entering into the system is allowed to increase slowly in case that the system is close to the state at which bottleneck occurs and has just left the state at which bottleneck occurs. Also, the number of requests entering into the system is rapidly reduced when bottleneck occurs, such that the system leaves the bottleneck state as soon as possible. This method is simple and easy to implement, and can realize segmented flow control.

FIG. 9 shows apparatus 900 that is used for system detection. Apparatus 900 includes:

acquiring module 910 configured to acquire throughput and response time of the system;

calculating module 920 configured to obtain system performance characteristic parameter based on the acquired throughput and response time, the system performance characteristic parameter being used to describe congestion condition of the system;

determining module 930 configured to determine whether there is bottleneck in the system based on the system performance characteristic parameter.

In this embodiment, for descriptions about the system, the system performance characteristic parameter, the throughput and response time etc., reference can be made to the method embodiments, description of which will be omitted for brevity.

In this embodiment, calculating module 920 is further configured to calculate the system performance characteristic parameter based on the throughput and the response time, where the system performance characteristic parameter is proportional to the throughput and inversely proportional to the response time. For more details on the calculation method for the system performance characteristic parameter, reference can be made to the method embodiment.

In this embodiment, calculating module 920 can be further configured to calculate the system performance characteristic parameter based on the throughput and the response time, where the system performance characteristic parameter is inversely proportional to the throughput and proportional to the response time.

In this embodiment, for example, acquiring module 910 can comprise a sampling sub-module and a first filtering sub-module. The sampling sub-module is configured to directly sample the throughput and the response time of the system. The first filtering sub-module is configured to conduct noise filtering on the sampled throughput and response time. Accordingly, calculating module 920 is further configured to obtain system performance characteristic parameter based on the noise filtered throughput and response time.

In this embodiment, for example, calculating module 920 can include a first calculating sub-module and a second filtering sub-module. The first calculating sub-module is configured to obtain system performance characteristic parameter based on the throughput and the response time, and the second filtering sub-module is configured to conduct noise filtering on the system performance characteristic parameter. Accordingly, determining module 930 is further configured to determine whether there is a bottleneck in the system based on the noise filtered system performance characteristic parameter.

Figure 12:
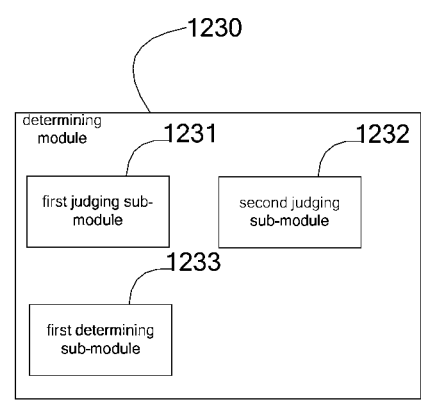
FIG. 12 shows another structural diagram of a determining module in the apparatus for system detection according to an embodiment of the present invention.

The determining module in this embodiment can use determining module 1230 shown in FIG. 12, determining module 1230 includes:

first judging sub-module 1231 configured to judge whether current data is in a trend of increasing, the current data includes at least one of the throughput and the response time;

second judging sub-module 1232 configured to judge whether current system performance characteristic parameter is in a trend of decreasing;

first determining sub-module 1233 configured to determine that there is a bottleneck in the system if the current data is in a trend of increasing and the current system performance characteristic parameter is in a trend of decreasing.

In this embodiment, as to how first judging sub-module 1231 judges whether the current data is in a trend of increasing, and how second judging sub-module 1232 judges whether current system performance characteristic parameter is in a trend of decreasing, reference can be made to the method embodiment.

In this embodiment, functions of first judging sub-module 1231 and second judging sub-module 1232 can be combined. In this embodiment, when first determining sub-module 1233 determines that there is a bottleneck in the system, for example, an indication can also be issued so as to notify other modules or devices that there is bottleneck in the system.

Figure 11:
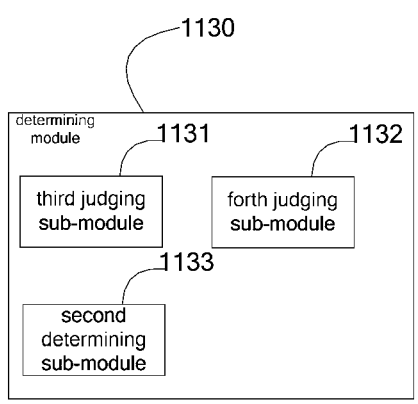
FIG. 11 shows a structural diagram of a determining module in the apparatus for system detection according to an embodiment of the present invention.

The determining module in the above apparatus embodiments can use the determining module 1130 shown in FIG. 11. Determining module 1130 includes:

third judging sub-module 1131 configured to judge whether current data is in a trend of increasing, the data includes at least one of the throughput and the response time;

forth judging sub-module 1132 configured to judge whether current system performance characteristic parameter is in a trend of increasing;

second determining sub-module 1133 configured to determine that there is a bottleneck in the system if the current data is in a trend of increasing and the current system performance characteristic parameter is in a trend of increasing.

In this embodiment, as to how third judging sub-module 1131 judges whether the current data is in a trend of increasing, and how forth judging sub-module 1132 judges whether current system performance characteristic parameter is in a trend of increasing, reference can be made to the method embodiment.

In this embodiment, functions of third judging sub-module 1131 and the forth judging sub-module 1132 can be combined. In this embodiment, when second determining sub-module 1133 determines that there is a bottleneck in the system, for example, an indication can also be issued so as to notify other modules or devices that there is a bottleneck in the system.

Figure 7:
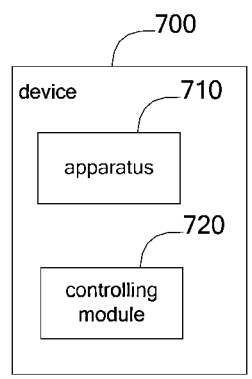
FIG. 7 shows a structural diagram of a device for flow control according to an embodiment of the present invention.

As shown in FIG. 7, an embodiment of the invention provides a device 700 for flow control. Device 700 includes:
apparatus 710 configured to determine whether there is a bottleneck in a system, the detailed embodiment of which can be combined with the above apparatus embodiment; controlling module 720 configured to initiate flow control on the system if apparatus 710 determines that there is bottleneck in the system.

In this embodiment, controlling module 720 can, for example, perform flow control on the system based on an AIMD algorithm or other algorithms. For specific implementation thereof, reference can be made to the method embodiment.

In this embodiment, device 700 can be located outside of the system or at an interface thereof, such that all requests from outside of the system enter into the system via device 700 and all responses to the requests flow out of the system via device 700; that is, responses are sent to a destination outside of the system. As such, device 700 can directly obtain throughput of the system in a convenient way, and facilitates flow control.

As shown in FIG. 10, an embodiment of the invention provides a device 1000 for flow control. Device 1000 includes:

apparatus 1020 configured to determine whether there is a bottleneck in the system. Its detailed implementation can be combined with the above apparatus embodiment.

Device 1000 also includes:

first setting module 1040 configured to set the maximal number of requests that are currently allowed to enter into the system as $R_a=R_{a-1}/S$ if there is a bottleneck in the system, wherein, S is a number larger than 1;

second setting module 1050 configured to set the maximal number of requests that are currently allowed to enter into the system as $R_a=R_{a-1}+W$ if there is no bottleneck in the system, where, W is a positive integer;

rejecting module 1060 configured to reject new request to enter into the system if the number of requests that have currently entered into the system reaches or exceeds the maximal number of requests that are currently allowed to enter into the system.

In this embodiment, functions of first setting module 1040 and second setting module 1050 can be combined together.

In this embodiment, in order to rapidly increase the maximal number of requests that are allowed to enter into the system at initial phase, device 1000 can further include a third setting module configured to set the maximal number of requests that are currently allowed to enter into the system as $R_a=BR_{a-1}$, where $R_a$ is the maximal number of requests that are currently allowed to enter into the system, $R_{a-1}$ is the previous maximal number of requests that are allowed to enter into the system, B is a number larger than 1. Device 1000 can also include a first judging module configured to judge whether the system is in an initial phase. For the judgment of initial phase, reference can be made to the corresponding method embodiment.

For the detailed implementation of various modules and apparatus in this embodiment, reference can be made to the method embodiments and the apparatus embodiments.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system detection method, the method comprising:
   acquiring a throughput and a response time of a system, wherein the throughput reflects the number of requests from outside of the system that has been processed by the system, and the response time reflects time required by the system to process requests from outside of the system, wherein the acquiring throughput and response time of the system comprises:
   directly sampling the throughput and the response time of the system; and
   conducting noise filtering on the sampled throughput and response time;
   obtaining a system performance characteristic parameter based on the throughput and the response time, the system performance characteristic parameter being used to describe congestion condition of the system, and the system performance characteristic parameter being based on the noise filtered throughput and response time; and
   determining that there is a bottleneck in the system based on the system performance characteristic parameter.

2. The method according to claim 1, wherein the obtaining system performance characteristic parameter based on the throughput and the response time comprises:
   calculating the system performance characteristic parameter based on the throughput and the response time, wherein the system performance characteristic parameter is proportional to the throughput and inversely proportional to the response time.

3. The method according to claim 2, wherein the determining whether there is a bottleneck in the system based on the system performance characteristic parameter comprises:
   judging whether current data is in a trend of increasing, wherein the current data includes at least one of the throughput and the response time;
   judging whether a current system performance characteristic parameter is in a trend of decreasing; and
   determining that there is a bottleneck in the system based on the current data being in a trend of increasing and the current system performance characteristic parameter is in a trend of decreasing.

4. The method according to claim 3, wherein the judging whether the current system performance characteristic parameter is in a trend of decreasing comprises:
   determining that the current system performance characteristic parameter is in a trend of decreasing based on the current system performance characteristic parameter meeting a specific condition, wherein the specific condition comprises one of the following characteristics:
   being less than a previous system performance characteristic parameter;
   being a continual $X^{th}$ system performance characteristic parameter meeting $P_m<P_{m-1}$, wherein $P_{m-1}$ is a previous system performance characteristic parameter of $P_m$;
   a difference of being less than the maximum value of system performance characteristic parameter exceeding a predetermined range; and
   being a continual $Y^{th}$ system performance characteristic parameter meeting that $P_{max}-P_n$ exceeds a predetermined range, wherein $P_{max}$ is the maximum value of system performance characteristic parameter.

5. The method according to claim 1, wherein the obtaining system performance characteristic parameter based on the throughput and the response time comprises:
    calculating the system performance characteristic parameter based on the throughput and the response time, wherein the system performance characteristic parameter is inversely proportional to the throughput and proportional to the response time.

6. The method according to claim 5, wherein the determining whether there is a bottleneck in the system based on the system performance characteristic parameter comprises:
    judging whether current data is in a trend of increasing, wherein the current data includes at least one of the throughput and the response time;
    judging whether current system performance characteristic parameter is in a trend of increasing; and
    determining that there is a bottleneck in the system based on the current data being in a trend of increasing and the current system performance characteristic parameter is in a trend of increasing.

7. The method according to claim 6, wherein the judging whether current system performance characteristic parameter is in a trend of increasing comprises:
    determining that the current system performance characteristic parameter is in a trend of decreasing based on the current system performance characteristic parameter meeting a specific condition, wherein the specific condition comprises one of the following characteristics:
    being larger than a previous system performance characteristic parameter;
    being the continual $X^{th}$ system performance characteristic parameter meeting $P_m > P_{m-1}$, wherein $P_{m-1}$ is a previous system performance characteristic parameter of $P_m$;
    a difference of being larger than the minimum value of system performance characteristic parameter exceeding a predetermined range; and
    being the continual $Y^{th}$ system performance characteristic parameter meeting that $P_n - P_{min}$ exceeds a predetermined range, wherein $P_{min}$ is the minimum value of system performance characteristic parameter.

8. The method according to claim 1, wherein the obtaining system performance characteristic parameter based on the throughput and the response time comprises:
    obtaining system performance characteristic parameter based on the throughput and the response time; and
    conducting noise filtering on the system performance characteristic parameter,
    wherein the determining whether there is a bottleneck in the system based on the system performance characteristic parameter comprises:
    determining whether there is bottleneck in the system based on the noise filtered system performance characteristic parameter.

9. The method according to claim 1, further comprising, based on determining that there is a bottleneck in the system, initiating flow control on the system.

10. The method according to claim 9, wherein the flow control is based on an Additive Increase Multiplicative Decrease (AIMD) algorithm.

11. An apparatus for system detection, the apparatus comprising:
    an acquiring module that when operating acquires throughput and response time of a system, wherein the throughput reflects a number of requests from outside of the system that have been processed by the system, and the response time reflects time required by the system to process requests from outside of the system, the acquiring module comprising:
    a sampling sub-module that when operating directly samples the throughput and the response time of the system; and
    a first filtering sub-module that when operating conducts noise filtering on the sampled throughput and response time which creates a noise filtered a noise filtered throughput and response time;
    a calculating module that when operating obtains a system performance characteristic parameter based on the throughput and the response time, the system performance characteristic parameter being based on the noise filtered throughput and noise filtered response time and used to describe congestion condition of the system; and
    a determining module that when operating determines whether there is a bottleneck in the system based on the system performance characteristic parameter.

12. The apparatus according to claim 11, wherein the calculating module, when operating, further:
    calculates the system performance characteristic parameter based on the throughput and the response time, wherein the system performance characteristic parameter is proportional to the throughput and inversely proportional to the response time.

13. The apparatus in accordance with claim 12, wherein the determining module comprises:
    a first judging sub-module that when operating judges whether current data is in a trend of increasing, wherein the current data includes at least one of the throughput and the response time;
    a second judging sub-module that when operating judges whether current system performance characteristic parameter is in a trend of decreasing; and
    a first determining sub-module that when operating determines that there is a bottleneck in the system based on the current data being in a trend of increasing and the current system performance characteristic parameter is in a trend of decreasing.

14. The apparatus according to claim 11, wherein the calculating module, when operating, further:
    calculates the system performance characteristic parameter based on the throughput and the response time, wherein the system performance characteristic parameter is inversely proportional to the throughput and proportional to the response time.

15. The apparatus according to claim 14, wherein the determining module comprises:
    a third judging sub-module that when operating judges whether current data is in a trend of increasing, wherein the current data includes at least one of the throughput and the response time;
    a forth judging sub-module that when operating judges whether current system performance characteristic parameter is in a trend of increasing; and
    a second determining sub-module that when operating determines that there is a bottleneck in the system based on the current data being in a trend of increasing and the current system performance characteristic parameter is in a trend of increasing.

16. The apparatus in accordance with claim 11, wherein the calculating module comprises:
    a first calculating sub-module configured to obtain a system performance characteristic parameter based on the throughput and the response time; and a second filtering sub-module configured to conduct noise filtering on the system performance characteristic parameter which creates a noise filtered system performance character parameter, wherein the determining module is further configured to determine whether there is a bottleneck in the system based on the noise filtered system performance characteristic parameter.

17. The apparatus in accordance with claim 11, further comprising a controlling module that, when operating, based on a determination that there is a bottleneck in the system, initiates flow control on the system.

18. The device according to claim 17, wherein each request coming from outside of the system enters into the system via the device, and each response thereto is transmitted to destination outside of the system via the device.

* * * * *